(12) United States Patent
Bolognino et al.

(10) Patent No.: US 7,477,419 B2
(45) Date of Patent: Jan. 13, 2009

(54) PREPRESS PROCEDURE OF EXCLUSIVE FOUR-COLOR REPRODUCTION WITH ENHANCED GAMUT FOR ROTOGRAVURE AND SPECIAL INKS, COLOR CHART AND SOFTWARE USED

(75) Inventors: Oscar Dante Bolognino, Córdoba (AR); Antonio Carlos De Llamas, Nueva Córdoba (AR)

(73) Assignee: Corintech S.A., Cordoba (AR)

( * ) Notice: Subject to any disclaimer, the term of this patent is extended or adjusted under 35 U.S.C. 154(b) by 740 days.

(21) Appl. No.: 10/980,512

(22) Filed: Nov. 3, 2004

(65) Prior Publication Data

US 2005/0099641 A1 May 12, 2005

(30) Foreign Application Priority Data

Nov. 7, 2003 (AR) .............................. P 030104098

(51) Int. Cl.
*H04N 1/50* (2006.01)
*B41C 1/02* (2006.01)

(52) U.S. Cl. .................. 358/1.9; 358/518; 358/501; 358/3.29

(58) Field of Classification Search ................ 358/3.29, 358/501, 518, 530, 531, 1.9
See application file for complete search history.

(56) References Cited

U.S. PATENT DOCUMENTS

| | | | |
|---|---|---|---|
| 3,740,222 | A | 6/1973 | McGlashan, Sr. |
| 4,612,052 | A | 9/1986 | Schwartz |
| 4,649,502 | A | 3/1987 | Keller et al. |
| 4,881,181 | A | 11/1989 | Jeschke et al. |

(Continued)

FOREIGN PATENT DOCUMENTS

AR 020679 9/1999

(Continued)

*Primary Examiner*—Thomas D Lee
(74) *Attorney, Agent, or Firm*—Bachman & LaPointe, P.C.

(57) ABSTRACT

This procedure consists in a first stage of reception of the information given by a client and its technical analysis. It also consists in a second stage of preparation of photochromes and flat colors on the basis of the "Pantone" scale and the CMYK part of the original file. It consists in a third stage of transfer from the "Pantone" scale to an own scale and obtaining the flat colors with this scale. It consists in a fourth stage of reproduction and correction of the color and of the tone scale up to a 97% of approximation, and a fifth stage of calibration by software and manual retouching of these colors and the tone scale up to a 99% of approximation. Finally, this procedure consists in a sixth stage of preparation of the engraving final images in the printing cylinder and storage in an adequate medium. The third stage includes three steps. The first one is the selection of those colors that are nearer to the original. The second step is the application of the secondary curves to achieve the tone compensation and obtain the halftones of the spot colors and turn them into CMYK colors. The last step is the application of the tertiary curves to achieve suitable gradient cuts. In the fourth and fifth stages, the achieved tone and color value arises from considering the ICC output profiles and the ICC input profiles with a suitable calibration for color tests. The ICC output profile will be the one of the enhanced gamut inks which are used, while the ICC input profile will be, preferably, a standardized profile.

9 Claims, 1 Drawing Sheet

U.S. PATENT DOCUMENTS

| | | |
|---|---|---|
| 5,224,421 A | 7/1993 | Doherty |
| 5,530,656 A | 6/1996 | Six |
| 5,734,800 A * | 3/1998 | Herbert et al. ............... 358/1.9 |
| 5,958,124 A | 9/1999 | Perz et al. |
| 6,024,018 A | 2/2000 | Darel et al. |
| 6,061,501 A | 5/2000 | Decker et al. |
| 6,137,594 A | 10/2000 | Decker et al. |
| 6,281,984 B1 | 8/2001 | Decker et al. |

FOREIGN PATENT DOCUMENTS

| | | |
|---|---|---|
| AR | 020890 | 9/1999 |
| EP | 1 351 487 A2 | 10/2003 |

* cited by examiner

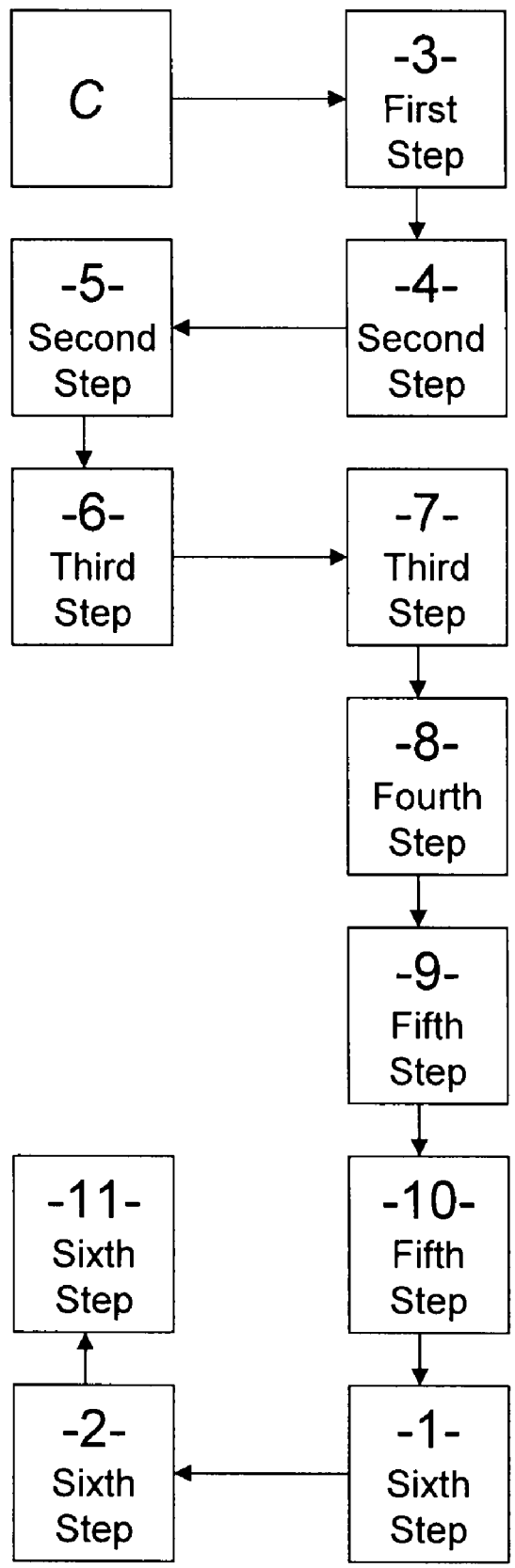

PREPRESS PROCEDURE OF EXCLUSIVE FOUR-COLOR REPRODUCTION WITH ENHANCED GAMUT FOR ROTOGRAVURE AND SPECIAL INKS, COLOR CHART AND SOFTWARE USED

BACKGROUND OF THE INVENTION (1) Field of the Invention

This invention consists in a prepress procedure of exclusive four-color reproduction with enhanced gamut for rotogravure and special inks, color chart and software used.

(2) Prior Art

A search number performed by the Department of Technological Information has identified the documents U.S. Pat. Nos. 6,024,018, 5,530,656, 5,224,421, 4,881,181 and 4,649,502 as relating to the printing, using CMYK inks. Apart from the above search, the documents U.S. Pat. Nos. 5,958,124 and 4,612,052 were also found in relation to special inks for rotogravure. By analyzing the documents, the U.S. Pat. No. 6,024,018 refers to a printing color control system that optimizes the assembly of several ink keys in a printing press according to a witness image and a reference image. The witness image and reference image include several key ink areas corresponding to several ink areas which include several interest regions. The system includes a unit to scan a printing area, producing the reference and the witness images; a unit to summarize the color information based on the current color image of the witness image; a unit to measure the deviations from color with regard to the reference image and a unit to analyze and compare the global characteristics of the interest regions that substantially include the color gamut of the witness image with the characteristics of the reference image. The analysis and the comparison are based on a plurality of interest regions placed in the same key ink area. Both the analysis and the comparison work to produce an ink change (CMYK) to be applied to a plurality of ink keys. The system also includes a unit to apply those changes (CMYK) to that plurality of ink keys. However, the U.S. Pat. No. 5,530,656 refers to a method to control the ink supply in a printing machine in order to print halftones. The U.S. Pat. No. 5,224,421 refers to a method to adjust and control the color in a printing press based on the color density spectrum. The document U.S. Pat. No. 4,881,181 refers to a procedure to determine the ink unit control variables in a printing press which allows performing an ink area control with a repetitive cycle of the measured areas. Finally, the document U.S. Pat. No. 4,649,502 is a procedure and a device to test the printing quality and regulate the ink supply in a photo-offset printing machine.

SUMMARY OF THE INVENTION

The procedure revealed in the following paragraphs has been thought to achieve photochromes of more vivid colors, improve the accuracy of the color reproduction in the images and replace spot color inks (Pantone) with a four-color printing, resulting in a saving in cylinders and an ink stock reduction. The procedure allows standardizing the printing conditions, that is, searching the stability of the printing conditions along the time, from the analysis of a series of variables such as temperature, ink, speed, dilution, densities of the full colors, viscosity, etc. The standardization achieved with the procedure also allows reducing the periods of inactivity, increasing the efficiency and the production. Such stability will allow reducing the necessity of preparing new ICC profiles before each change in the printing conditions. In the case of a four-color reproduction of enhanced gamut, the replacement of the spot color inks is almost total; while in a four-color reproduction of standard or normal gamut, the replacement of the spot color inks is substantial. In relation to the previous art, this invention solves three problems of significant importance. In effect, the first problem to solve is to achieve a balanced printing matrix. This invention allows obtaining the matrix to achieve a printing from the four-basic colors (CMYK). The white color is eventually added to print on flexible packs. With this printing matrix a tone balance is achieved between the full colors and the halftones. The second problem to solve, from the four colors (CMYK), is to obtain the reproduction of most of the spot colors, such as the colors of a "Pantone" catalogue. This problem is solved from the use of special inks of enhanced gamut and a special process of the digital files which the matrices are prepared with. The last problem to solve is the use of special ink mixtures to obtain the colors to use. This problem is solved from the use of the matrix and of inks of enhanced or normal gamut. This is the reason why it is not necessary to replace cylinders or trays, since they can be used to perform different jobs. This allows a saving in mixtures whose remain must be removed. It also allows a uniformity of the printed colors in different printing jobs, even if in those cases there can be a slight difference exclusively determined by the different ink quantities.

BRIEF DESCRIPTION OF THE DRAWINGS

In the FIGURE attached hereto there is shown a flow chart which represents the different stages that constitute the procedure.

DETAILED DESCRIPTION OF THE PREFERRED EMBODIMENT(S)

In the FIGURE previously described, the same characters of reference indicate equal or corresponding parts. The number (1) corresponds to an engraving image, the number (2) a printing cylinder or matrix, the number (3) a technical department and the number (4) a photochrome. The reference number (5) corresponds to a flat color of reference, the number (6) a color chart, the number (7) a contractual test of color, and the number (8) a digital correction of the color. The reference number (9) corresponds to a manual retouching, the number (10) a final image, the number (11) an adequate medium, and the letter (c) a client. Basically the procedure of the present invention is composed of several stages. The first stage consists in the reception of the client's information and its technical analysis. The second stage is the preparation of photochromes and flat colors on the basis of the "Pantone" scale. The third stage is the digital treatment of the photochromes and other colors of the four-color reproduction and the transfer from this "Pantone" scale to an own scale, using a chart color especially designed, and obtaining the flat colors with this scale. The fourth stage is the reproduction and adjustment of the colors and of the tone scale up to a 97% of approximation. The fifth stage is the calibration by software and manual retouching of the tone scale up to a 99% of approximation, and the sixth stage is the preparation of the engraving matrices or cylinders, with engraving curves specifically developed for such purpose. The invention also includes a color chart especially designed for the selection and the special inks used. After establishing the stage sequence to explain the nature of the invention, then it is complemented with their functional and operative relationship and the result they provide. The invention is mainly based on a procedure which is composed of several stages. This procedure is complemented with special inks, color chart and an adequate software. Through the procedure described in the following paragraphs, the inventor has tried to reduce substantially the number of ink colors and of cylinders used to print, to reduce the periods of inactivity, to remove the special ink mixtures, to achieve a balanced printing matrix and to obtain a job registration that through an adequate program allows repeating it in the same way.

With such objectives, the inventor has designed several stages in which there is a participation of several technical factors. Their results are permanently controlled until to obtain a final register.

The inventor has considered that all the prepress job is essential to obtain a printing result suitable to the client's request.

For that reason and having studied the different stages to obtain the engraving image (1) for the engraving of a printing cylinder (2), the inventor has concluded that is better to consider a series of standardized stages and manual corrections.

So, in a first stage the printing job ordered by a client (c) goes to the technical department (3) which analyzes the order and prepares a sample. Then, the sample is discussed with the client (c) to determine corrections and improvements, and then its final approval is achieved.

With the final approval, in a second stage, the photochromes (4) and the necessary flat colors of reference (5) are prepared on the basis of the "Pantone" scale colors as well the cyan, magenta, yellow and black colors from the original file. In the procedures of the previous art, the reproduction of the "Pantone" colors implies that it is necessary to use different inks combined among themselves. This needs an estimate which must be as rough as possible about the amount of the several mixtures to achieve in order not to overproduce because the remain cannot be stored. Therefore, we would waste material.

On the other hand, to prepare a limited mixture would force to produce a new mixture with the almost risk of not achieving the same color.

However, even if the ink calculations to combine is almost accurate, that does not leave the possibility that the client (c) orders a new printing job when the previous one is still in market.

Cases like the previous ones allow us to observe that there are differences in the colors of the flexible packs in the same product shown to the public.

Taking into account that this procedure has been developed to be applied in a prepress job of four-color reproduction, the "Pantone" scale must be achieved from the combination of the four colors, that in the practice are the cyan, the magenta, the yellow and the black ones.

Eventually, the white color can be needed as a fifth one, since it will be the printing base in "OPP" materials and similar ones which are now widely used.

In order to achieve a color scale equivalent to the so called "Pantone" scale, the inventor has developed a color chart (6). In a third stage, and by an adequate software, this color chart gives the possibility to transfer the "Pantone" scale to the own scale to obtain the new flat colors which will be included in the contractual test of color (7). Although this transfer from one scale to another mainly uses this adequate software, it is necessary some manual retouching.

In a fourth stage, also by the adequate software, the reproduction and the adjustment of the colors (8) and of the tone scale are performed up to a 97% of approximation in the photochromes and/or the colors of the own color chart (6). Just as in the previous case, and in order to achieve an approximation of greater precision than the achieved one with the software, the fifth stage consists in the calibration by software and the manual retouching (9) of the colors and of this tone scale until to achieve a 99% of approximation to the tones searched, achieving, in this way, a final image (10).

Finally, the sixth stage consists in the preparation of the engraving images (1) which will be used in the engraving cylinder (2), and the storage of all the data collected during this procedure in a suitable medium (11), for example, a compact disk or the similar.

Keeping this information allows having a complete registration of each of the jobs ordered. For that reason, when an order is repeated, it will be enough to locate the adequate medium (11) in which it was kept to reproduce it. The procedure is called of prepress because it is applied to the previous stages to the preparation of the printing cylinders or matrices (2). As a result of the above mentioned stages, we obtain a set of final images (10) which reproduce all the colors, both flat ones and photochromes, adequately. During this procedure the engraving curves are also developed to reproduce all the tone scale with a minimum which is not superior to 1%. In the procedures of the previous art this tone value is between the 3% and the 4%.

The reduced deviation value of the achieved color arises from considering the ICC output profiles and ICC input profiles, performing a suitable calibration to the color test system, for example "Digital Cromalin" or similar ones. So, the ICC output profile will be that of the enhanced gamut inks which are used, while the ICC input profile will be, preferably, a standardized profile, for example Eurostandard, SWOP or similar ones. In order to achieve the desired tone value, a color chart (6) has been created. This color chart (6) is preferably of enhanced gamut in order to allow the accurate reproduction of the largest number of spot colors ("Pantone" scale) for being in the gamut or achieve less color difference (Delta E) in those colors which are still out of the gamut. The accurate reproduction of a much higher percentage of "Pantone" colors than the one with the traditional systems is achieved, from the cyan (C), magenta (M) and yellow (Y) colors to which the black (K) color is added, and eventually the white one, and thanks to the use of special inks. Likewise, with this invention, a much higher approximation is achieved in those colors whose reproduction is not accurate.

This invention allows the printing of much more vivid color images or photochromes (4) than the ones obtained with the procedures of the previous art. This improvement in the accuracy and the image coloring is still kept when using standard gamut inks. In this invention all the design elements (full colors, gradients, etc) are printed with the four CMYK colors. But, when there are very small letters, as the superimposition of different color microdots can produce a blurred image, it is better to print only with the black color.

In the second stage, in a first step, the part composed of CMYK colors is digitally separated from that of the spot colors ("Pantone"). Then, in a second step, the file section referred to the CMYK colors is placed in a software which, using the ICC output profile and the ICC input profile, obtains a file. The colors are put in this file, adjusting them to its reproduction with inks of enhanced gamut.

As it was said before, in the third stage, the transfer of the spot colors ("Pantone" scale) from the original file to an own scale represented in the color chart (6) is performed. From this chart color, in a first step and by an expert observation and an adequate software, those colors that are nearer to the original are selected. In a second step, the secondary curves are applied to achieve the tone compensation. These curves are specially developed to obtain the halftones of the spot colors, and in that way to turn them adequately into CMYK halftones and full tones. Finally, in a third step, the tertiary curves are developed for gradient cuts.

In the fourth stage, in order to achieve the suitable reproduction of the colors and of the tone scale, a software of analysis and color process is used. With this software, the approximation can be taken between a 96% and a 97% of the tone original value in relation to the color chart (6) and the photochromes (4), using in the process the secondary and the tertiary curves specially developed for such purpose. It is not possible, with a software of analysis and color process, to take the approximation to the original color more than in the referred magnitude. However, the procedure consists in a fifth stage of revision of the result obtained in the previous one. As the difference of color is given by a technical question which is the result of the way in which the original is obtained, the solution must take into account the possibility of correcting it. In effect, it is usual that the original is obtained through an image scanning process, that is, through light and, therefore, with predominance of the red (R), green (G) and blue (B) colors. These colors have a wider gamut than that of the four CMYK colors; therefore, some tones will be lost in the transformation process during the fourth stage. Taking into account that the human eye receives the colors on the same predominance base (RGB) as the scanner, a skilled worker, working on the monitor and not on the software, can obtain an approximation of the 99% to the desired colors in this manual retouching (9). In that way the final engraving images (10) are obtained and they will allow preparing the matrix or printing cylinder (2). The inks used in this procedure are special, of enhanced gamut, and the procedure is based on the use of four colors composed of the cyan (C), the magenta (M), the yellow (Y) and the black (K) colors. These colors are based on special pigments, specially on the magenta color. In this color the combination up to an 80% of the "Rodamin Red" pigment (pink CH/NCA 23720) (base) and up to a 20% of the "Rubine Red" pigment (Red CH/NCA 23360) (base) enhances the gamut. The other colors include several pigments. The cyan color is made of blue NCA 24470 (chips) as base pigment; the yellow one is based on the CH/NCA 21352 pigment and the black color is based on the NCA 27250 pigment (chips). All the inks include special additives to improve the reproduction of the small dot. According to the pigments used in the ink preparation, the gamut can change, enhancing a spectrum area to the detriment of another one. This the reason why the technical department (3) will try to achieve a suitable balance in relation to the specific requirements of the client (c) and a suitable optical density, estimating that it should be equal to or more than 1.7. This number will be in direct relationship with the resins and ink pigments. In the traditional systems the inks are no often good for other jobs because they are results of special mixtures. Taking into account that there are no special mixtures in this procedure, the containers of the different inks will be four, that is to say, one for each ink. Therefore, the procedure requires the use of four containers, perhaps of five ones before an unexpected use of the white color. In this procedure, it must be emphasized that the color order is regular. In the traditional systems it changes permanently.

According to the requirements of the job, the black ink container can be in the first or the last place in the container line. This regular order allows washing approximately 20 trays a month versus the 600 to 620 trays used in the traditional systems.

The fact of using only four containers which contain special inks but not special colors obtained by mixture allows achieving a great speed of replacement, having estimated the replacement in an average of 10-15 minutes versus an average of 80-90 minutes in the traditional methods. As it is not necessary to mix colors in order to achieve a particular one, this indicates that the colors to obtain are always the same, with the only exception of the changes produced as a consequence of the different pigment quantities.

In some cases it can be necessary to remove the cyan color. In effect, due to a stability problem in the printer, the cyan color can make certain ocher colors turn to a greenish tone which is usually rejected in food packaging. For that reason the printing jobs for food packaging are usually back-side printed jobs which take an inserted film so that the inks are not in contact with the food.

The color chart (6) has been developed in a standard way; that is to say, with a printed version and with a digital one. The color chart with digital version allows its integration as a library of colors in any standard software of graphic design, for example "Adobe Photoshop and Illustrator", "ArtPro" and similar ones. The color chart (6) has been developed with a content of gradual percentages in a particular way in each of the cyan, magenta and yellow colors. As in the monitor the metallized colors are difficult to distinguish, it is better to use the color chart (6) printed with the colors and the final stratigraphy of the job; and for a better control of the printing conditions, the inventor has included the registration marks with a especially designed scale of balance of gray colors and a fine dot scale between 5 and 0%.

The use of several programs has been emphasized to manage the variables presented. For that reason, in order to use all the programs, an image processing software is provided and it enables an almost complete automatization. This automatization and the achieved standardization allow any skilled worker to use this invention, reducing the cost and the error margin in a substantial way.

In relation to the cost reduction, it is evident that there are less cylinders, trays and ink containers. On the other hand, when using the ink containers in the same order as usual, it is not necessary to replace or change them of place as in the systems of the previous art. In relation to the replacement or change of place, this job takes between 80 and 90 minutes, including the washing of trays. In this invention it is not necessary to wash the tray or change it of place. The software also allows labeling the different stages of the procedure to perform a subsequent control.

This procedure has been developed by considering the tone possibility that the inks of enhanced gamut provide. However, all the phases and stages described can be performed by using inks of standard gamut. In this way, one of the possible stage sequences has been described. The stage sequences take to realize the invention and the way it works. The document is also complemented with the synthesis of the invention contained in the vindication terms which are added as follows.

In order to understand this invention so that it can be put into practice with ease, the foregoing paragraphs give a detailed description in a favorite way, making reference in it to the attached drawings, the whole as a purely demonstrative example but not restrictive of the invention. Their components can be selected among several equivalents without leaving the principles of the invention established in this document.

What is claimed is:

1. A prepress procedure of exclusive four-color printing with enhanced gamut for rotogravure comprising:
   in a first stage, receiving a client's information and analyzing said information;

in a second stage, preparing photochromes and flat colors on the basis of a Pantone scale and a CMYK part of a original file;

in a third stage, transferring from the Pantone scale to an own scale and obtaining flat colors with the own scale;

in a fourth stage, reproducing and adjusting the colors and a tone scale up to 97% of an approximation;

in a fifth stage, calibrating with software and manually retouching of the colors and the tone scale up to 99% approximation; and in a sixth stage, preparing engraved final images in an engraving cylinder and storage in an adequate medium.

2. The process according to claim 1, wherein in the third stage, performing the transformation of spot colors contained in the original file to the own scale represented in a color chart including a first step of selecting those colors that are nearer to the original; a second step of applying secondary curves to achieve tone compensation and obtain halftones of the spot colors and turn them into full colors; and a third step applying tertiary curves to achieve gradient cuts.

3. The process according to claim 1, wherein in the fourth and fifth stages, causing achieved tone and color value to arise from considering ICC output profiles and ICC input profiles with a suitable calibration for color tests, and wherein the ICC output profile will be that of enhance gamut inks which are used, while the ICC input profile will be a standardized one.

4. Special inks for use in the process of claim 1, of the type of enhanced gamut comprising a cyan color consisting in blue NCA 24470 chips as a base pigment, a magenta color including up to 80% of a Rodamin Red pigment base and up to 20% of a Rubine Red pigment base, a yellow color based on a pigment CH/NCA 21352 and a black color based on pigment NCA 27250 chips and wherein the special inks include additives to improve the transfer of a small dot.

5. Special inks according to claim 4, wherein the Rodamin Red pigment is pink CH/NCA 23720 and the Rubine Red pigment is red CH/NCA 23360.

6. Special inks according to claim 4, wherein a suitable optical density is at least 1.7.

7. The process according to claim 1, wherein in the third stage said process further comprises providing a color chart comprising a content of gradual percentages in a way in each of cyan, magenta, and yellow colors as the own scale.

8. The process according to claim 1, wherein the third further comprises printing said own scale with the colors and a final stratigraphy of a job and including a registration of marks with an especially designed scale of balance of gray colors and a scale of a fine dot between 0% and 5% to obtain a standardized printing.

9. The process according to claim 1, wherein said fifth step further comprises using said software to establish use of ink containers in an only order and label different stages for control purposes.

* * * * *